US012663862B2

(12) United States Patent
Imaya

(10) Patent No.: US 12,663,862 B2
(45) Date of Patent: Jun. 23, 2026

(54) INFORMATION PROCESSING DEVICE, CONTROL METHOD, AND NON-TRANSITORY COMPUTER READABLE MEDIUM FOR DETERMINING USER INTEREST BASED ON LINE-OF-SIGHT INFORMATION

(71) Applicant: CANON KABUSHIKI KAISHA, Tokyo (JP)

(72) Inventor: Shu Imaya, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 19/061,432

(22) Filed: Feb. 24, 2025

(65) Prior Publication Data

US 2025/0199613 A1     Jun. 19, 2025

Related U.S. Application Data

(63) Continuation of application No. PCT/JP2023/020973, filed on Jun. 6, 2023.

(30) Foreign Application Priority Data

Sep. 2, 2022     (JP) ................................. 2022-140049

(51) Int. Cl.
*G06F 3/01*          (2006.01)
(52) U.S. Cl.
CPC .................................... *G06F 3/013* (2013.01)
(58) Field of Classification Search
CPC ....................................................... G06F 3/013
See application file for complete search history.

(56) References Cited

U.S. PATENT DOCUMENTS 11,125,997 B2 *   9/2021   Onuki .................... G06F 3/0346
2007/0247524 A1 *  10/2007   Yoshinaga ........... G06V 40/193
348/78
(Continued)

FOREIGN PATENT DOCUMENTS

JP          2007-172378 A        7/2007
JP          2007-286995 A       11/2007
(Continued)

OTHER PUBLICATIONS

The International Search Report dated Aug. 1, 2023, of International Application No. PCT/JP2023/020973, which is enclosed with an English translation.

*Primary Examiner* — Afroza Chowdhury
(74) *Attorney, Agent, or Firm* — Cowan, Liebowitz & Latman, P.C.

(57)          ABSTRACT

An information processing device according to the present disclosure includes one or more processors and/or circuitry configured to execute first acquisition processing of acquiring line-of-sight information of a user, execute detection processing of detecting an object viewed by the user based on the line-of-sight information, execute second acquisition processing of acquiring, from a storage, reference information for determining a degree of interest of the user with respect to the object, the reference information being predetermined information corresponding to the object, and execute determination processing of determining the degree of interest based on the line-of-sight information and the reference information.

11 Claims, 10 Drawing Sheets

(56)                    References Cited

U.S. PATENT DOCUMENTS

| | | | |
|---|---|---|---|
| 2011/0298702 A1* | 12/2011 | Sakata | G06T 7/74 |
| | | | 345/156 |
| 2017/0024935 A1* | 1/2017 | Baba | G06F 3/0308 |
| 2018/0003979 A1* | 1/2018 | Nakashima | G02B 27/017 |
| 2018/0158242 A1* | 6/2018 | Sugawara | G06F 3/012 |
| 2020/0341274 A1* | 10/2020 | Onuki | G02B 27/017 |

FOREIGN PATENT DOCUMENTS

| | | |
|---|---|---|
| JP | 2008-112401 A | 5/2008 |
| WO | 2011/074198 W | 6/2011 |

* cited by examiner

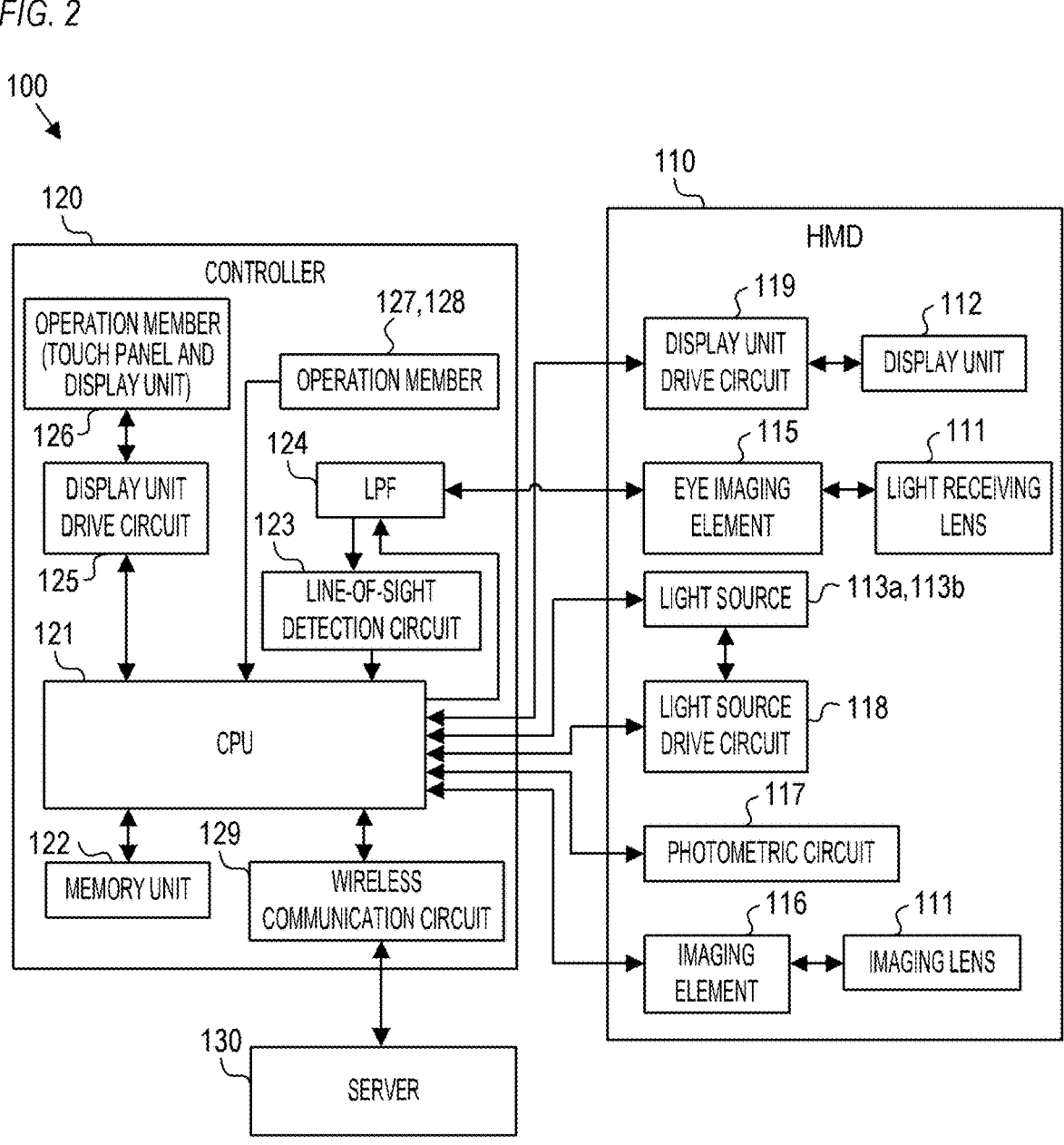

120

CONTROLLER

OPERATION MEMBER
(TOUCH PANEL AND
DISPLAY UNIT)

126

DISPLAY UNIT
DRIVE CIRCUIT

125

121

CPU 122                    129

MEMORY UNIT          WIRELESS
COMMUNICATION CIRCUIT 127,128

OPERATION MEMBER

124

LPF

123

LINE-OF-SIGHT
DETECTION CIRCUIT

110

HMD

119

DISPLAY UNIT
DRIVE CIRCUIT

112

DISPLAY UNIT

115

EYE IMAGING
ELEMENT

111

LIGHT RECEIVING
LENS

LIGHT SOURCE          113a,113b

LIGHT SOURCE
DRIVE CIRCUIT          118

117

PHOTOMETRIC CIRCUIT

116

IMAGING
ELEMENT

111

IMAGING LENS

130

SERVER

CENTER OF
EYEBALL

θ x  Oc b  Pd

Pe

114

113a

115

Pd'

Pe'

X-AXIS
DIRECTION

Z-AXIS
DIRECTION

Y-AXIS
DIRECTION

*FIG. 5*

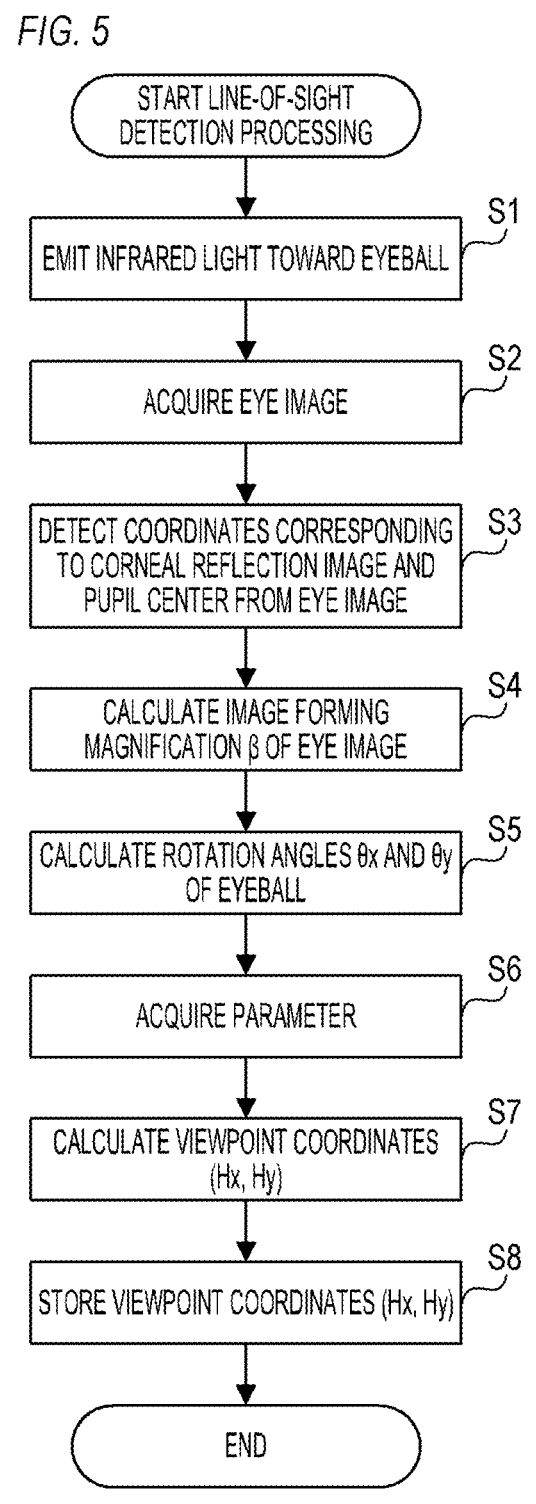

```
        ┌─────────────────────────┐
        │   START LINE-OF-SIGHT    │
        │   DETECTION PROCESSING   │
        └─────────────────────────┘
                     │
                     ▼
        ┌─────────────────────────┐  S1
        │ EMIT INFRARED LIGHT TOWARD EYEBALL │
        └─────────────────────────┘
                     │
                     ▼
        ┌─────────────────────────┐  S2
        │     ACQUIRE EYE IMAGE    │
        └─────────────────────────┘
                     │
                     ▼
        ┌─────────────────────────────┐  S3
        │ DETECT COORDINATES CORRESPONDING │
        │ TO CORNEAL REFLECTION IMAGE AND  │
        │ PUPIL CENTER FROM EYE IMAGE      │
        └─────────────────────────────┘
                     │
                     ▼
        ┌─────────────────────────┐  S4
        │  CALCULATE IMAGE FORMING │
        │ MAGNIFICATION β OF EYE IMAGE │
        └─────────────────────────┘
                     │
                     ▼
        ┌─────────────────────────┐  S5
        │ CALCULATE ROTATION ANGLES θx AND θy │
        │        OF EYEBALL        │
        └─────────────────────────┘
                     │
                     ▼
        ┌─────────────────────────┐  S6
        │     ACQUIRE PARAMETER    │
        └─────────────────────────┘
                     │
                     ▼
        ┌─────────────────────────┐  S7
        │ CALCULATE VIEWPOINT COORDINATES │
        │         (Hx, Hy)         │
        └─────────────────────────┘
                     │
                     ▼
        ┌─────────────────────────┐  S8
        │ STORE VIEWPOINT COORDINATES (Hx, Hy) │
        └─────────────────────────┘
                     │
                     ▼
        ┌─────────────────────────┐
        │           END           │
        └─────────────────────────┘
```

*FIG. 6*

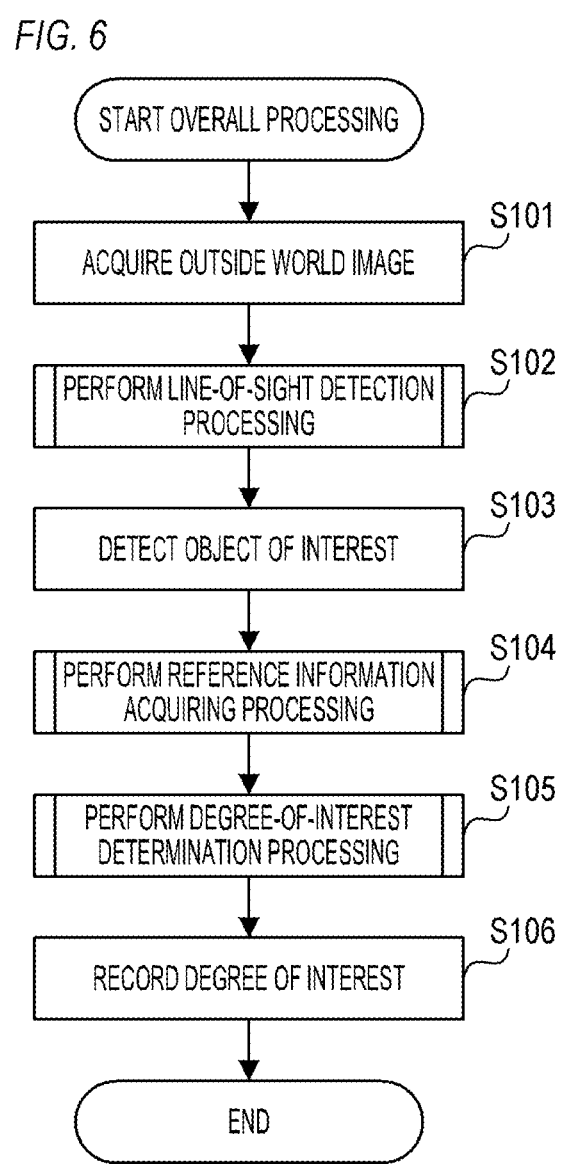

```
      ┌──────────────────────────┐
      │ START OVERALL PROCESSING │
      └──────────────────────────┘
                   │
                   ▼
      ┌──────────────────────────┐   S101
      │ ACQUIRE OUTSIDE WORLD IMAGE │
      └──────────────────────────┘
                   │
                   ▼
      ┌──────────────────────────┐   S102
      │ PERFORM LINE-OF-SIGHT DETECTION │
      │         PROCESSING        │
      └──────────────────────────┘
                   │
                   ▼
      ┌──────────────────────────┐   S103
      │  DETECT OBJECT OF INTEREST │
      └──────────────────────────┘
                   │
                   ▼
      ┌──────────────────────────┐   S104
      │ PERFORM REFERENCE INFORMATION │
      │     ACQUIRING PROCESSING  │
      └──────────────────────────┘
                   │
                   ▼
      ┌──────────────────────────┐   S105
      │  PERFORM DEGREE-OF-INTEREST │
      │  DETERMINATION PROCESSING │
      └──────────────────────────┘
                   │
                   ▼
      ┌──────────────────────────┐   S106
      │  RECORD DEGREE OF INTEREST │
      └──────────────────────────┘
                   │
                   ▼
             ┌──────────┐
             │   END    │
             └──────────┘
```

EYE CATCH AREA

OBJECT OF INTEREST
(ADVERTISEMENT MEDIUM)

No. 1 IN OOO
EXCELLENT EFFECT IN ☐☐☐☐
△△ COMPANY

TEXT AREA

IMAGE AREA

SETTING AREA 2
· EYE CATCH AREA
· WEIGHT w2 = 1

OBJECT OF INTEREST
(ADVERTISEMENT MEDIUM)

No. 1 IN OOO
EXCELLENT EFFECT IN ☐☐☐☐
△△ COMPANY

SETTING AREA 3
· TEXT AREA
· WEIGHT w3 = 3

SETTING AREA 1
· IMAGE AREA
· WEIGHT w1 = 3
· RELATED AREA
  = SETTING AREA 2

INFORMATION PROCESSING DEVICE, CONTROL METHOD, AND NON-TRANSITORY COMPUTER READABLE MEDIUM FOR DETERMINING USER INTEREST BASED ON LINE-OF-SIGHT INFORMATION

CROSS-REFERENCE TO RELATED APPLICATIONS

This application is a Continuation of International Patent Application No. PCT/JP2023/020973, filed Jun. 6, 2023, which claims the benefit of Japanese Patent Application No. 2022-140049, filed Sep. 2, 2022, all of which are hereby incorporated by reference herein in their entirety.

BACKGROUND OF THE DISCLOSURE

Field of the Disclosure

The present disclosure relates to an information processing device, and more particularly to a technique for determining a degree of interest of a person in an object.

Background Art

A technique for determining a degree of interest of a person in an object based on line-of-sight information of the person is proposed. PTL 1 discloses a technique for counting the number of people viewing an advertisement content displayed on an advertisement display device based on a line-of-sight direction of a person existing in an area where the advertisement display device is installed. PTL 2 discloses a technique for determining a degree of interest of a passenger for an object to be gazed based on a gaze duration time of the passenger (passenger of a moving body) for the object to be gazed.

CITATION LIST

Patent Literature

PTL 1 JP 2008-112401 A
PTL 2 JP 2007-172378 A

SUMMARY OF THE DISCLOSURE

In the related art (for example, the techniques disclosed in PTLs 1 and 2), the degree of interest of a person with respect to an object is determined by regarding an act of the person looking at the object as an act of the person having an interest in the object. However, it cannot be considered that a person is interested in an object, just because the person looks at the object. Therefore, the degree of interest cannot be determined with high accuracy in the related art.

The present disclosure provides a technique capable of determining a degree of interest of a person in an object with high accuracy.

The present disclosure in its first aspect provides an information processing device including one or more processors and/or circuitry configured to execute first acquisition processing of acquiring line-of-sight information of a user, execute detection processing of detecting an object viewed by the user based on the line-of-sight information, execute second acquisition processing of acquiring, from a storage, reference information for determining a degree of interest of the user with respect to the object, the reference information being predetermined information corresponding to the object, and execute determination processing of determining the degree of interest based on the line-of-sight information and the reference information.

The present disclosure in its second aspect provides a control method of an information processing device, including acquiring line-of-sight information of a user, detecting an object viewed by the user based on the line-of-sight information, acquiring, from a storage, reference information for determining a degree of interest of the user with respect to the object, the reference information being predetermined information corresponding to the object, and determining the degree of interest based on the line-of-sight information and the reference information.

The present disclosure in its third aspect provides a non-transitory computer readable medium that stores a program, wherein the program causes a computer to execute a control method of an information processing device, the control method including acquiring line-of-sight information of a user, detecting an object viewed by the user based on the line-of-sight information, acquiring, from a storage, reference information for determining a degree of interest of the user with respect to the object, the reference information being predetermined information corresponding to the object, and determining the degree of interest based on the line-of-sight information and the reference information.

Further features of the present disclosure will become apparent from the following description of exemplary embodiments with reference to the attached drawings.

BRIEF DESCRIPTION OF THE DRAWINGS

FIG. 2 is a block diagram illustrating an electrical configuration of the display system;
FIG. 3 is a diagram for describing a principle of a line-of-sight detection method;
FIG. 5 is a flowchart of line-of-sight detection processing;
FIG. 6 is a flowchart of overall processing.

DESCRIPTION OF THE EMBODIMENTS

First Embodiment

Figure 1A:
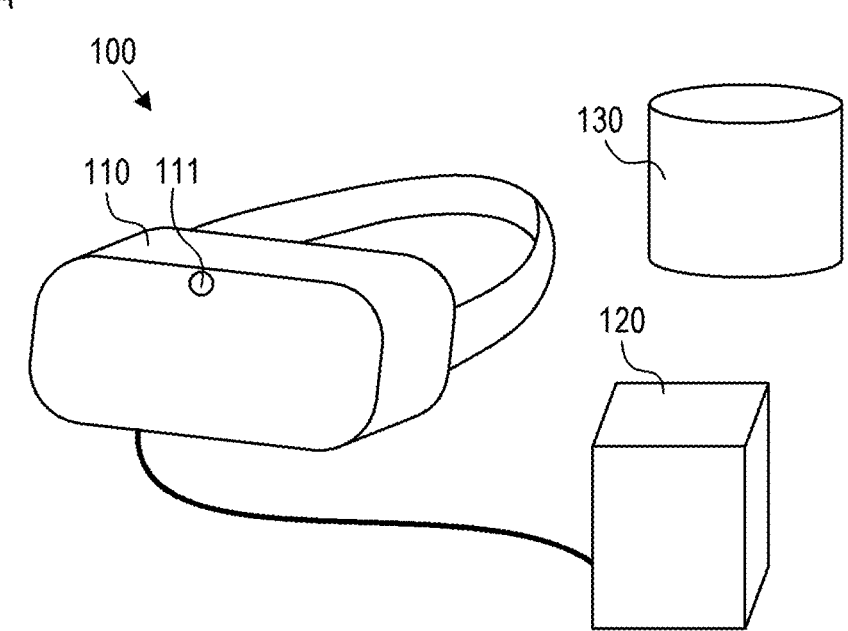
FIGS. 1A and 1B are external views of a display system.

A first embodiment of the present disclosure is described.
Note that the present disclosure is applicable to various electronic devices capable of acquiring line-of-sight information (information on a line of sight) of a person. For example, the present disclosure is applicable to both a video see-through display device and an optical see-through display device. The video see-through display device displays an image (virtual space) obtained by capturing a real space on a display surface (display surface that does not transmit light from the real space (outside world)) by combining graphics (for example, virtual objects) as necessary. In this case, the user cannot directly view the real space but can indirectly view the real space or view graphics combined with the image of the real space by viewing the displayed image. The optical see-through display device displays graphics, for example, on a display surface (a display surface that transmits light from a real space). In this case, the user can directly view the real space through the display surface or view graphics displayed on the display surface.

The present disclosure is applicable to both a head mounted display device and other display devices. For example, the present disclosure is also applicable to a handheld display device and a stationary display device. The head mounted display device is, for example, a smart glass (augmented reality (AR) glass) or a head mounted display (HMD). The handheld display device is, for example, a smartphone or a tablet terminal. A display device that is held with the hands and mounted on (applied to) the head by the user is a type of handheld display device and is also a type of head mounted display device. A smartphone mounted on a head mounted adapter (for example, virtual reality (VR) goggles) is a type of head-mounted display device. The present disclosure is applicable to both a head mounted display device in which a user views an image with both eyes and a head mounted display device in which a user views an image with one eye.

The present disclosure is also applicable to a method of allowing a user to visually recognize only a virtual space without allowing the user to visually recognize a real space. That is, the present disclosure is applicable to various types of cross reality (XR), for example, augmented reality (AR), mixed reality (MR), and virtual reality (VR).

The present disclosure is also applicable to electronic devices other than the display device. The information processing device to which the present disclosure is applied may be provided in a display device or may be provided in an electronic device separate from the display device. For example, the present disclosure is also applicable to a controller or a personal computer (PC) connected to a display device. The present disclosure is also applicable to a monitoring camera.

In the first embodiment, the line-of-sight information of the person is acquired, and the degree of interest of the person with respect to the object is determined based on the line-of-sight information. In the first embodiment, the object is a real object, but the object may be a virtual object. In the related art, the degree of interest of a person with respect to an object is determined by regarding an act of the person looking at the object as an act of the person having an interest in the object. However, it cannot be considered that a person is interested in an object, just because the person looks at the object. Therefore, the degree of interest cannot be determined with high accuracy in the related art.

For example, an advertising medium (for example, posters, signage, and digital signage) may have a large area for an eye catch (eye catch area). The eye catch area is, for example, an area in which a photograph of a person (advertisement model) or a catch phrase is disposed in a large size. Here, the eye catch area may have low relevance to an advertisement target (for example, a product or a service). Therefore, even if the person looks at the eye catch area, the person may not associate with the advertisement target and may not have an interest in the advertisement target and the advertisement medium. Note that the area having low relevance to the advertisement target is not limited to the eye catch area.

Therefore, in the first embodiment, the degree of interest of the person with respect to the object is determined with high accuracy based on a suitable determination reference according to the object. For example, the degree of interest is determined with high accuracy by a determination reference in consideration of the content of the object (intention of the design of the object).

<Description of Configuration>

Figure 1B:
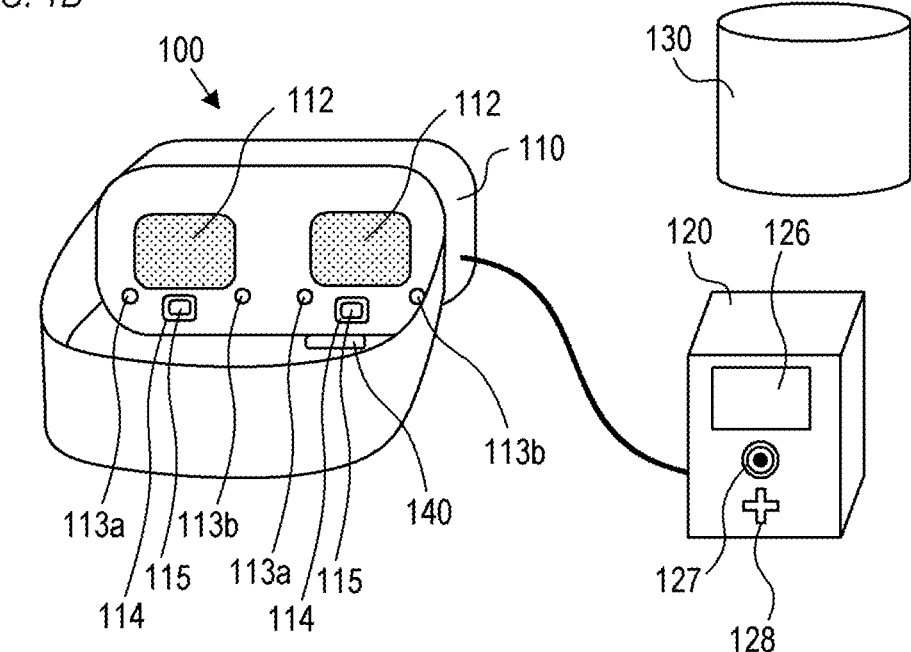

FIGS. 1A and 1B illustrate an appearance of a display system 100 according to the first embodiment. FIG. 1A is a front perspective view, and FIG. 1B is a rear perspective view. As illustrated in FIG. 1A, the display system 100 includes an HMD 110, a controller 120, and a server 130. In the first embodiment, it is assumed that the HMD 110 is used as a video see-through HMD. The controller 120 is connected to the HMD 110 in a wired manner and is connected to the server 130 in a wireless manner. The controller 120 may be wirelessly connected to the HMD 110. FIG. 2 is a block diagram illustrating an electrical configuration of the display system 100.

As illustrated in FIGS. 1A, 1B, and 2, the HMD 110 includes an imaging lens 111, display units 112, light sources 113a and 113b, light receiving lens 114, eye imaging elements 115, and a knob 140. Furthermore, as illustrated in FIG. 2, the HMD 110 includes an imaging element 116, a photometric circuit 117, a light source drive circuit 118, and a display unit drive circuit 119. As illustrated in FIG. 1B, the display unit 112, the light sources 113a and 113b, the light receiving lens 114, and the eye imaging element 115 are provided for each of the right eye and the left eye of the user.

The imaging lens 111 is a lens for imaging the outside world, and the imaging element 116 is an imaging element for imaging the outside world. The imaging element 116 is disposed on a planned imaging plane of the imaging lens 111.

The display unit 112 displays various images (information). For example, the display unit 112 displays an image of the outside world captured by the imaging element 116 or displays information on an object viewed by the user. The display unit drive circuit 119 is controlled by the controller 120 (a CPU 121 described below) to drive the display unit 112.

Each of the light source 113a and the light source 113b is a light source that illuminates the eye of the user, and is, for example, an infrared light emitting diode that emits infrared light insensitive to the user. The light source drive circuit 118 is controlled by the controller 120 (CPU 121) to drive the light sources 113a and 113b. A part of the light emitted from the light sources 113a and 113b and reflected on the eyes of the user is condensed on the eye imaging elements 115 by the light receiving lens 114. The light receiving lens 114 are lens for imaging the eyes of the user, and the eye imaging elements 115 are imaging elements for imaging the eyes of the user.

The knob 140 is a knob for adjusting the interval between the display unit 112 for the right eye and the display unit 112 for the left eye so as to match the distance between the pupils of the user.

The photometric circuit 117 performs amplification, logarithmic compression, and A/D conversion of a signal obtained from the imaging element 116 that also serves as a photometric sensor, specifically, a brightness signal corresponding to the brightness of the shooting target field and sends the result to the controller 120 (CPU 121) as shooting target field brightness information.

The controller 120 includes the CPU 121, a memory unit 122, a line-of-sight detection circuit 123, a low-pass filter (LPF) 124, a display unit drive circuit 125, operation members 126 to 128, and a wireless communication circuit 129.

The CPU 121 is a central processing unit of a microcomputer incorporated in the controller 120 and controls the entire display system 100.

The memory unit 122 has a function of storing a video signal from the eye imaging element 115 and a function of storing a line-of-sight correction parameter. The line-of-sight correction parameter is a parameter for correcting an individual difference in the line of sight. Further, the memory unit 122 has a function of storing degree-of-interest reference information. The degree-of-interest reference information is predetermined information corresponding to the object and is reference information for determining the degree of interest of the user for the object. The memory unit 122 stores a plurality of pieces of degree-of-interest reference information respectively corresponding to a plurality of objects.

The line-of-sight detection circuit 123 performs A/D conversion on the output (eye image obtained by imaging the eye) of the eye imaging element 115 in a state where the optical image of the eye is formed on the eye imaging element 115 and transmits the result to the CPU 121 via the LPF 124. The CPU 121 extracts a feature point necessary for detecting the line of sight from the eye image according to a predetermined algorithm described below and detects the line of sight of the user from the position of the feature point.

The operation members 126 to 128 receive an operation from the user and output an operation signal (a signal corresponding to an operation performed by the user) to the CPU 121. For example, the operation member 126 is a touch panel capable of receiving a touch operation, the operation member 127 is an operation lever capable of being pushed down in each direction, and the operation member 128 is a four-direction key capable of being pushed in each of the four directions. The operation member 126 (touch panel) has a function of displaying an image (information). As described above, the operation member 126 has a function as a touch panel and a function as a display unit. The display unit drive circuit 125 is controlled by the CPU 121 and drives the operation member 126 (display unit). The user can perform various operations (instructions) using the operation members 126 to 128. For example, the user can finely adjust the position of a user interface (UI, for example, an index) displayed on the display unit 112 using the operation members 126 to 128.

The wireless communication circuit 129 is controlled by the CPU 121 and communicates with an external device. For example, the wireless communication circuit 129 transmits and records the degree of interest (the degree of interest of the user for the object) determined by the CPU 121 to the server 130 via the Internet.

<Description of Line-of-Sight Detection Processing>

Figure 3:
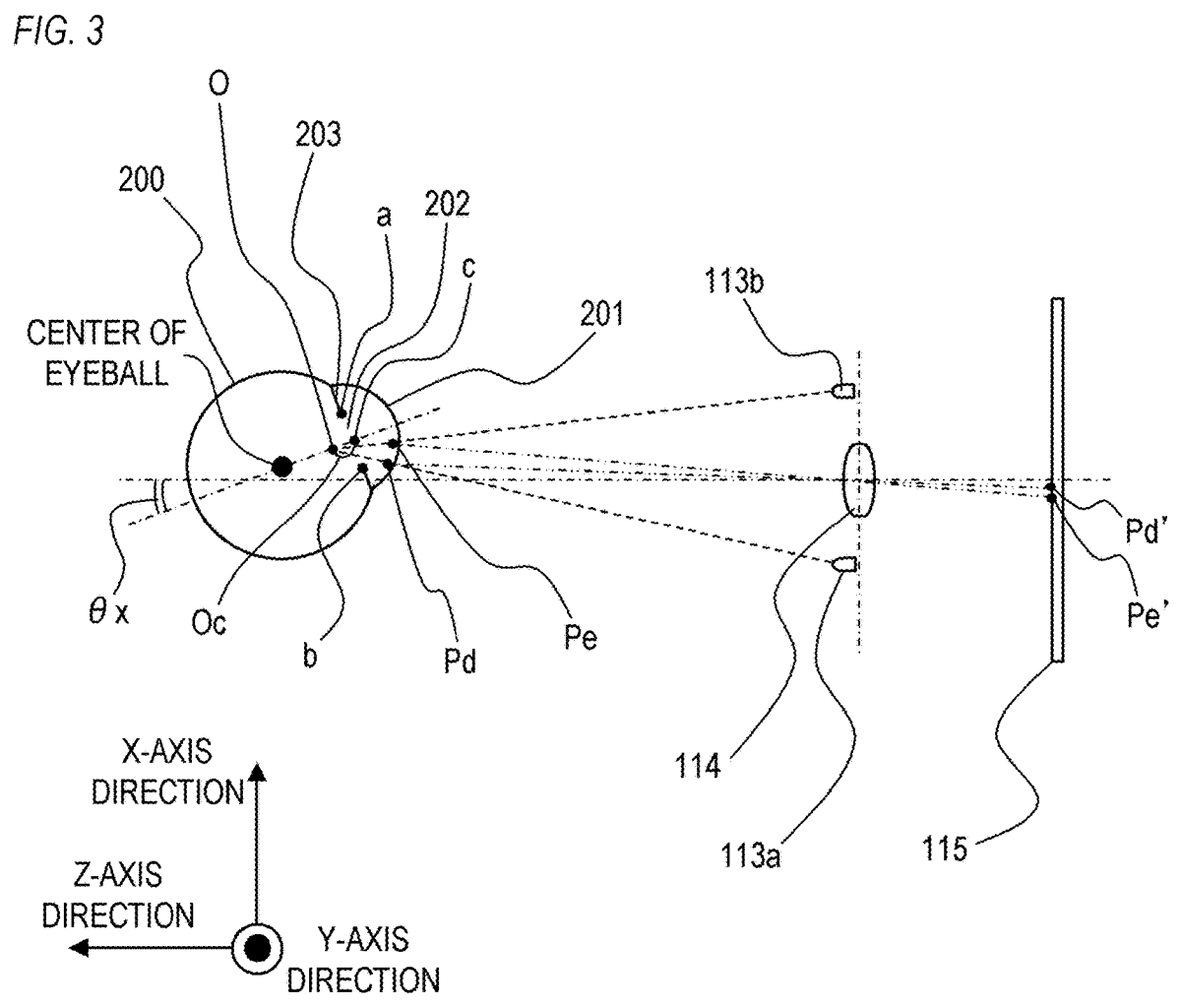
Figure 4A:
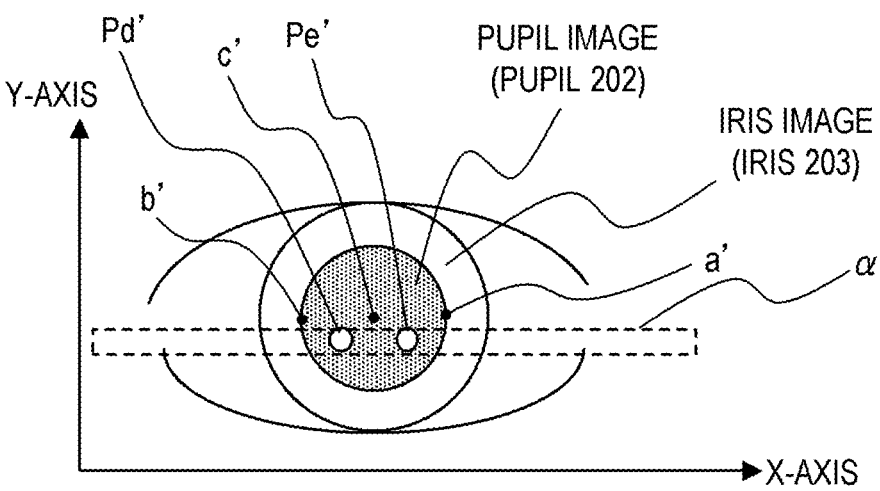
FIG. 4A is a view illustrating an eye image.
Figure 4B:
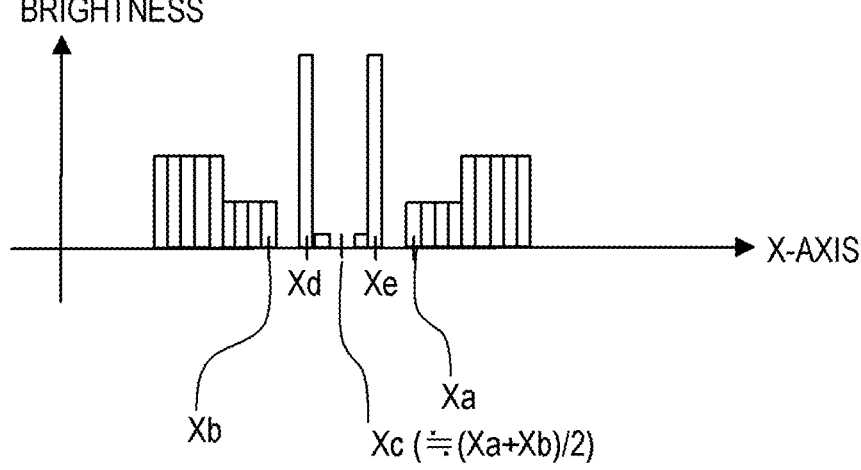
FIG. 4B is a view illustrating a brightness distribution of the eye image.

The line-of-sight detection processing (line-of-sight detection method) is described with reference to FIGS. 3, 4A, 4B, and 5. Both the line of sight of the right eye and the line of sight of the left eye are detected by the following line-of-sight detection method. FIG. 3 is a diagram illustrating a principle of a line-of-sight detection method and is a schematic diagram of an optical system for detecting a line of sight. As illustrated in FIG. 3, the light sources 113a and 113b are arranged substantially symmetrically with respect to the optical axis of the light receiving lens 114 and illuminate eyeballs 200 of the user. A part of the light emitted from the light sources 113a and 113b and reflected on the eyeballs 200 is condensed on the eye imaging elements 115 by the light receiving lens 114. FIG. 4A is a schematic diagram of an eye image (an optical image of an eye projected on the eye imaging element 115) captured by the eye imaging element 115 and FIG. 4B is a diagram illustrating output intensity of the eye imaging element 115. FIG. 5 is a flowchart of line-of-sight detection processing.

When the line-of-sight detection processing in FIG. 5 starts, in step S1, the CPU 121 drives the light sources 113a and 113b using the light source drive circuit 118 so as to emit infrared light toward the eyeball 200 of the user. The optical image of the eye of the user illuminated by the infrared light is formed on the eye imaging elements 115 through the light receiving lens 114 and is photoelectrically converted by the eye imaging element 115. Thereby, an electrical signal of the processable eye image is obtained.

In step S2, the CPU 121 acquires an eye image (image data, image signal) from the eye imaging element 115 via the line-of-sight detection circuit 123.

In step S3, the CPU 121 detects coordinates of points corresponding to corneal reflection images Pd and Pe of the light sources 113a and 113b and a pupil center c from the eye image obtained in step S2.

The infrared light emitted from the light sources 113a and 113b illuminates a cornea 201 of the eyeball 200 of the user. At this time, the corneal reflection images Pd and Pe formed by a part of the infrared light reflected by the surface of the cornea 201 are condensed by the light receiving lens 114 and formed on the eye imaging element 115 to become corneal reflection images Pd' and Pe' in the eye image. Similarly, light fluxes from end portions a and b of a pupil 202 are also imaged on the eye imaging elements 115 and become pupil end images a' and b' in the eye image.

FIG. 4B illustrates brightness information (brightness distribution) of an area a in the eye image of FIG. 4A. FIG. 4B illustrates the brightness distribution in the X-axis direction with the horizontal direction of the eye image as the X-axis direction and the vertical direction as the Y-axis direction. In the first embodiment, coordinates of the corneal reflection images Pd' and Pe' in the X-axis direction (horizontal direction) are Xd and Xe, and coordinates of the pupil end images a' and b' in the X-axis direction are Xa and Xb. As illustrated in FIG. 4B, at the coordinates Xd and Xe of the corneal reflection images Pd' and Pe', brightnesses at an extremely high level are obtained. In the area from the coordinates Xa to the coordinates Xb, which corresponds to the area of the pupil 202 (the area of the pupil image obtained by imaging the light flux from the pupil 202 on the eye imaging element 115), brightness with an extremely low level is obtained except for the coordinates Xd and Xe. Then, in the area of an iris 203 outside the pupil 202 (the area of the iris image outside the pupil image obtained by imaging the light flux from the iris 203), intermediate brightness between the above two types of brightness is obtained. For example, in an area where the X coordinate (coordinate in the X-axis direction) is larger than the coordinate Xa and an area where the X coordinate is smaller than the coordinate Xb, intermediate brightness between the two types of brightness is obtained.

The X coordinates Xd and Xe of the corneal reflection images Pd' and Pe' and the X coordinates Xa and Xb of the pupil end images a' and b' can be obtained from the brightness distribution as illustrated in FIG. 4B. For example, coordinates with extremely high brightness can be obtained as coordinates of the corneal reflection images Pd' and Pe', and coordinates with extremely low brightness can be obtained as coordinates of the pupil end images a' and b'. When a rotation angle $\theta x$ of the optical axis of the eyeball 200 with respect to the optical axis of the light receiving lens 114 is small, coordinates Xc of a pupil center image c' (the center of the pupil image) obtained by imaging the light flux from the pupil center c on the eye imaging element 115 can be expressed as Xc≈(Xa+Xb)/2. That is, the coordinate Xc of the pupil center image c' can be calculated from the X coordinates Xa and Xb of the pupil end images a' and b'. In this manner, the coordinates of the corneal reflection images Pd' and Pe' and the coordinates of the pupil center image c' can be estimated.

In step S4, the CPU 121 calculates an image forming magnification β of the eye image. The image forming magnification β is a magnification determined by the position of the eyeball 200 with respect to the light receiving lens 114 and can be calculated using a function of an interval (Xd–Xe) between the corneal reflection images Pd' and Pe'.

In step S5, the CPU 121 calculates the rotation angle of the optical axis of the eyeball 200 with respect to the optical axis of the light receiving lens 114. The X coordinate of the midpoint between the corneal reflection image Pd and the corneal reflection image Pe substantially coincides with the X coordinate of a curvature center O of the cornea 201. Therefore, when a standard distance from the curvature center O of the cornea 201 to the center c of the pupil 202 is Oc, the rotation angle θx of the eyeball 200 in the Z-X plane (the plane perpendicular to the Y-axis) can be calculated by the following Formula 1. The rotation angle θy of the eyeball 200 in the Z-Y plane (the plane perpendicular to the X-axis) can also be calculated by a method similar to the method for calculating the rotation angle θx.

$$\beta \times Oc \times \mathrm{SIN}\theta x \approx \{(Xd + Xe)/2\} - Xc \qquad \text{(Formula 1)}$$

In step S6, the CPU 121 reads parameters necessary for detecting the line of sight from the memory unit 122. For example, the CPU 121 reads the parameters m, Ax, Bx, Ay, By, nx, and ny. The parameter m is a constant determined by the configuration of the optical system for performing the line-of-sight detection processing and is a conversion coefficient for converting the rotation angles θx and θy into coordinates corresponding to the pupil center c on the display unit 112. It is assumed that the parameter m is determined in advance and stored in the memory unit 122. The parameters Ax, Bx, Ay, and By are line-of-sight correction parameters for correcting individual differences in the lines of sight and are acquired by performing line-of-sight detection calibration. The parameter Ax is an offset value in the X-axis direction, the parameter Bx is a sensitivity coefficient in the X-axis direction, the parameter Ay is an offset value in the Y-axis direction, and the parameter By is a sensitivity coefficient in the Y-axis direction. It is assumed that the line-of-sight correction parameters Ax, Bx, Ay, and By are stored in the memory unit 122 before the line-of-sight detection processing starts. In the line-of-sight detection processing for the right eye, the parameter nx=nRx and the parameter ny=nRy are acquired, and in the line-of-sight detection processing for the left eye, the parameter nx=nLx and the parameter ny=nLy are acquired. The parameter nRx is a correction coefficient in the X-axis direction for obtaining the line-of-sight information of the right eye, and the parameter nRy is a correction coefficient in the Y-axis direction for obtaining the line-of-sight information of the right eye. The parameter nLx is a correction coefficient in the X-axis direction for obtaining the line-of-sight information of the left eye, and the parameter nLy is a correction coefficient in the Y-axis direction for obtaining the line-of-sight information of the left eye. It is assumed that the parameters nRx, nRy, nLx, and nLy are determined in advance and stored in the memory unit 122.

In step S7, the CPU 121 estimates the viewpoint of the user on the display unit 112 using the rotation angles θx and θy calculated in step S5 and the parameters m, Ax, Bx, Ay, By, nx, and ny read in step S6. The viewpoint can also be regarded as a position at which the line of sight is focused, a position at which the user is looking, or a line-of-sight position. It is assumed that the coordinates (Hx, Hy) of the viewpoint are coordinates corresponding to the pupil center c, the coordinates (Hx, Hy) of the viewpoint can be calculated by the following Formulas 2 and 3.

$$Hx = m \times (Ax \times \theta x + Bx) \times nx \qquad \text{(Formula 2)}$$

$$Hy = m \times (Ay \times \theta y + By) \times ny \qquad \text{(Formula 3)}$$

In step S8, the CPU 121 stores the coordinates (Hx, Hy) of the viewpoint in the memory unit 122 and ends the line-of-sight detection processing.

Note that the line-of-sight detection method is not limited to the above method, and for example, any method may be used as long as the method is a method of acquiring the line-of-sight information from the eye image. The line of sight may be detected by a method not using an eye image, such as a method of detecting an eye potential and detecting a line of sight based on the eye potential without using an eye image. As the final line-of-sight information, information indicating a line-of-sight direction (direction of line of sight) may be obtained instead of information indicating a viewpoint. For example, processing up to obtaining the rotation angle (Ax×θx+Bx)×nx, (Ay×θy+By)×ny without obtaining the coordinates (Hx, Hy) of the viewpoint may be performed. As the final line-of-sight information, information indicating viewpoints (intersection of the line of sight of the right eye and the line of sight of the left eye, position viewed by both eyes) of both eyes may be acquired.

<Description of Overall Processing>

Figure 7:
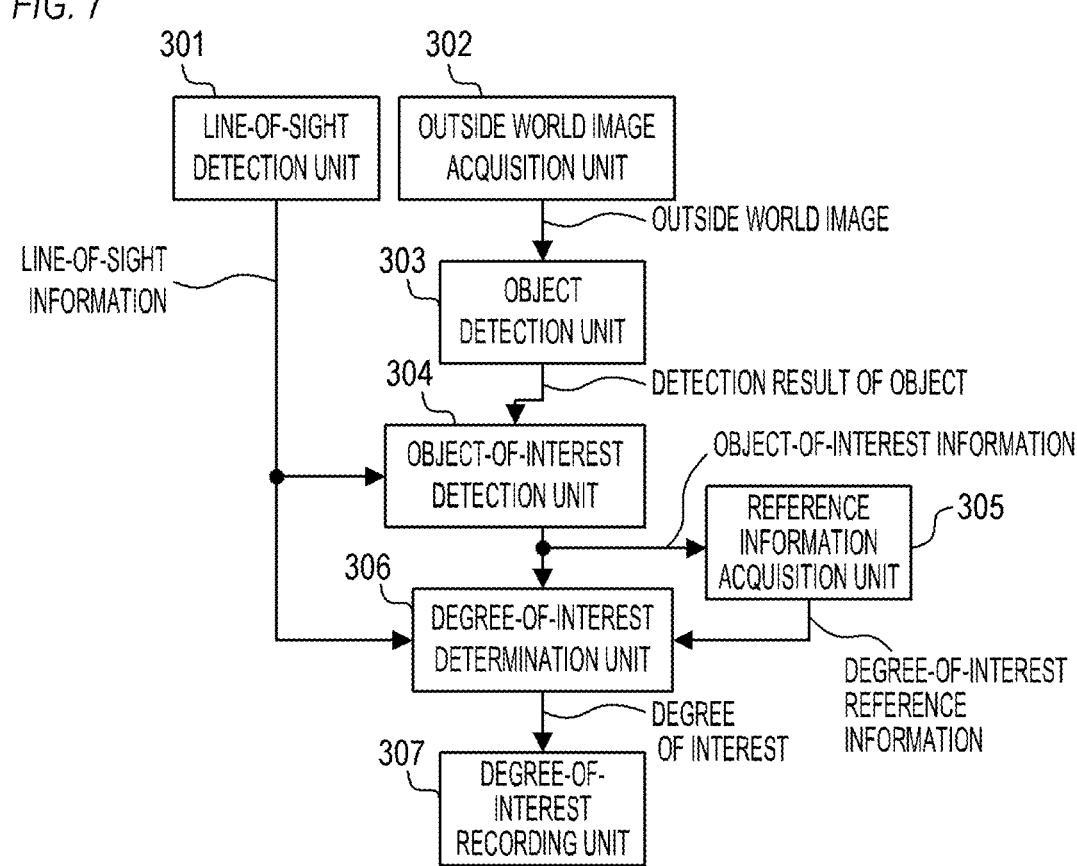
FIG. 7 is a block diagram illustrating a functional configuration of a display system.

The overall processing of the display system 100 (controller 120) is described with reference to FIGS. 6 and 7. FIG. 6 is a flowchart of overall processing. For example, when the user wears the HMD 110 and activates the HMD 110 and the controller 120, the overall processing of FIG. 6 is started. FIG. 7 is a block diagram illustrating a functional configuration of the display system 100. Each functional unit in FIG. 7 is realized by the CPU 121 of the controller 120.

When the overall processing of FIG. 6 is started, in step S101, an outside world image acquisition unit 302 acquires an image of the outside world (outside world image) captured by the imaging element 116. Though not illustrated in FIGS. 6 and 7, the CPU 121 performs predetermined image processing on the acquired outside world image and displays the image on the display unit 112.

In step S102, a line-of-sight detection unit 301 acquires the line-of-sight information of the user by performing the line-of-sight detection processing of FIG. 5.

In step S103, the CPU 121 detects an object (object of interest) viewed by the user based on the line-of-sight information acquired in step S102. For example, an object detection unit 303 detects an object from the outside world image acquired in step S101. Then, an object-of-interest detection unit 304 detects the object of interest from the object detected by the object detection unit 303 based on the line-of-sight information acquired in step S102. For example, the object of interest is detected based on information (for example, the locus of the viewpoint, the saccade of the eyeball, the time during which the viewpoint remains, and the number of times of gazing at the object) obtained from a plurality of pieces of time-series line-of-sight information. Through the processing of step S103, the object-of-interest information that is the detection result of the object of interest is acquired. Details of the object-of-interest information are described below.

In step S104, a reference information acquisition unit 305 acquires degree-of-interest reference information corresponding to the object of interest based on the object-of-interest information acquired in step S103 (reference information acquiring processing). In the first embodiment, the reference information acquisition unit 305 acquires the degree-of-interest reference information corresponding to the object of interest from the memory unit 122. Details of the degree-of-interest reference information are described below.

For example, it is assumed that the object-of-interest information indicates the position (a position in the real space, a position of the object of interest in a coordinate system of the real space (world coordinate system)) of the object of interest. Then, it is assumed that the position of the object corresponding to the degree-of-interest reference information is associated with the degree-of-interest reference information stored in the memory unit 122. In this case, the reference information acquisition unit 305 may acquire the degree-of-interest reference information associated with the position closest to the position indicated by the object-of-interest information from the memory unit 122.

The object-of-interest information may indicate the position and type of the object of interest. Then, the position and the type of the object corresponding to the degree-of-interest reference information may be associated with the degree-of-interest reference information stored in the memory unit 122. In this case, the reference information acquisition unit 305 may acquire the degree-of-interest reference information associated with the position closest to the position indicated by the object-of-interest information among the types of objects indicated by the object-of-interest information from the memory unit 122.

The object-of-interest information may include identification information (for example, an identifier) for identifying (specifying) the object of interest. Then, the identification information of the object corresponding to the degree-of-interest reference information may be associated with the degree-of-interest reference information stored in the memory unit 122. In this case, the reference information acquisition unit 305, the reference information acquisition unit 305 may acquire the degree-of-interest reference information associated with the identification information that is the same as the identification information included in the object-of-interest information from the memory unit 122.

The plurality of pieces of degree-of-interest reference information corresponding to the plurality of objects may be stored in the server 130. In this case, the reference information acquisition unit 305 may acquire the degree-of-interest reference information corresponding to the object of interest from the server 130. The processing of selecting the degree-of-interest reference information corresponding to the object of interest from the plurality of pieces of degree-of-interest reference information based on the plurality of pieces of the object-of-interest information may be performed by the reference information acquisition unit 305 or may be performed by the server 130. When the server 130 performs the processing of selecting the degree-of-interest reference information corresponding to the object of interest, for example, the reference information acquisition unit 305 transmits the object-of-interest information to the server 130, and the server 130 returns the degree-of-interest reference information corresponding to the object of interest to the reference information acquisition unit 305.

The object-of-interest detection unit 304 may detect the three-dimensional position of the object of interest based on the line-of-sight information of the right eye of the user and the line-of-sight information of the left eye of the user and generate object-of-interest information indicating the three-dimensional position. For example, the object-of-interest detection unit 304 determines (estimates) a three-dimensional positional relationship between the user (HMD 110) and the object of interest based on the line-of-sight information of the right eye, the line-of-sight information of the left eye, and the distance between the pupils (the distance between the display unit 112 for the right eye and the display unit 112 for the left eye). Then, the object-of-interest detection unit 304 detects (estimates) the three-dimensional position of the object of interest based on the three-dimensional position of the user (HMD 110) and the determined positional relationship. The three-dimensional position of the user (HMD 110) is estimated using, for example, a global positioning system (GPS). By using the three-dimensional position, the degree-of-interest reference information corresponding to the object of interest can be acquired with higher accuracy than a case of using the two-dimensional position n (it is possible to prevent a malfunction that the degree-of-interest reference information of an object different from the object of interest is acquired). Note that the method of estimating the three-dimensional position of the user (HMD 110) is not limited to the method using the GPS. For example, the three-dimensional position of the user (HMD 110) may be estimated by simultaneous localization and mapping (SLAM). The three-dimensional position of the user (HMD 110) may be estimated by odometry using an inertial measurement unit (IMU).

When the degree-of-interest reference information is prepared only for a specific type of object (for example, an advertisement medium), the processing of step S104 may be performed only when the type of the object of interest is the specific type (for example, when the medium of interest is the advertisement medium). By doing so, the processing load can be reduced.

In step S105, a degree-of-interest determination unit 306 determines the degree of interest of the user for the object of interest based on the line-of-sight information acquired in step S102, the object-of-interest information acquired in step S103, and the degree-of-interest reference information acquired in step S104. Details of the processing of step S105 (degree-of-interest determination processing) are described below.

In step S106, a degree-of-interest recording unit 307 transmits and records the degree of interest determined in step S105 to the server 130 via the Internet. The degree of interest may be recorded in the memory unit 122.

<Description of Degree-of-Interest Determination Processing>

Figure 8A:
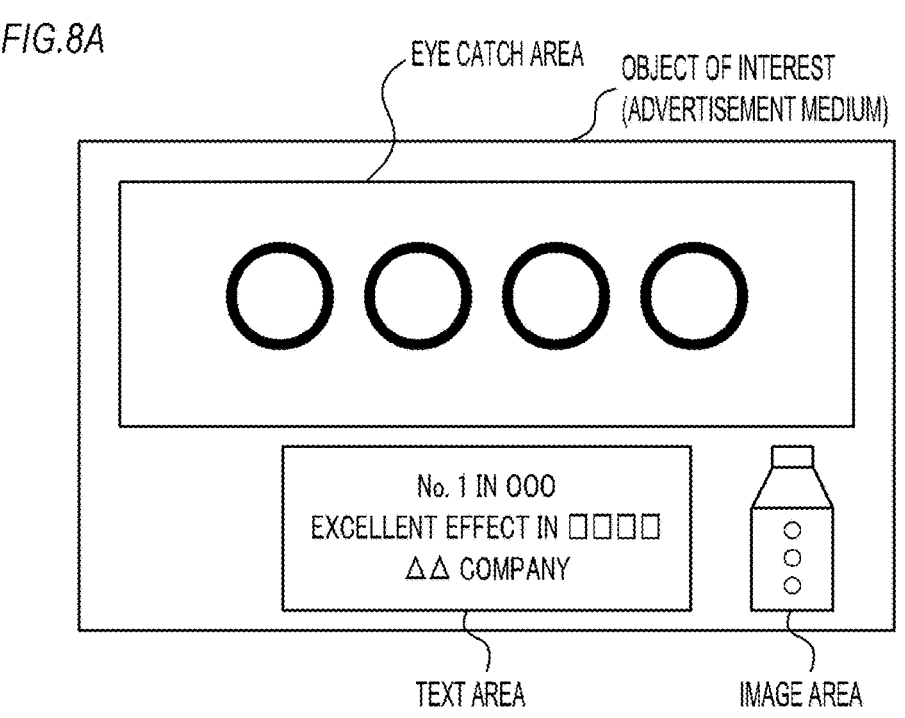
FIG. 8A is a diagram illustrating an object of interest.
Figure 8B:
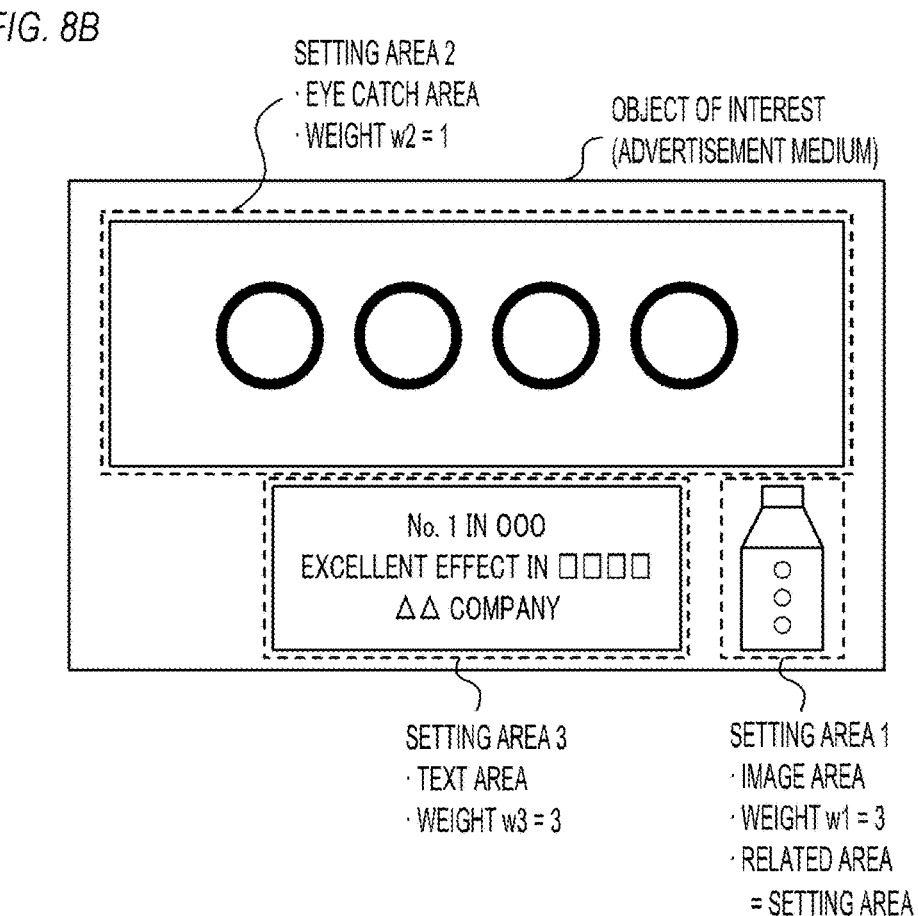
FIG. 8B is a diagram illustrating degree-of-interest reference information.
Figure 9:
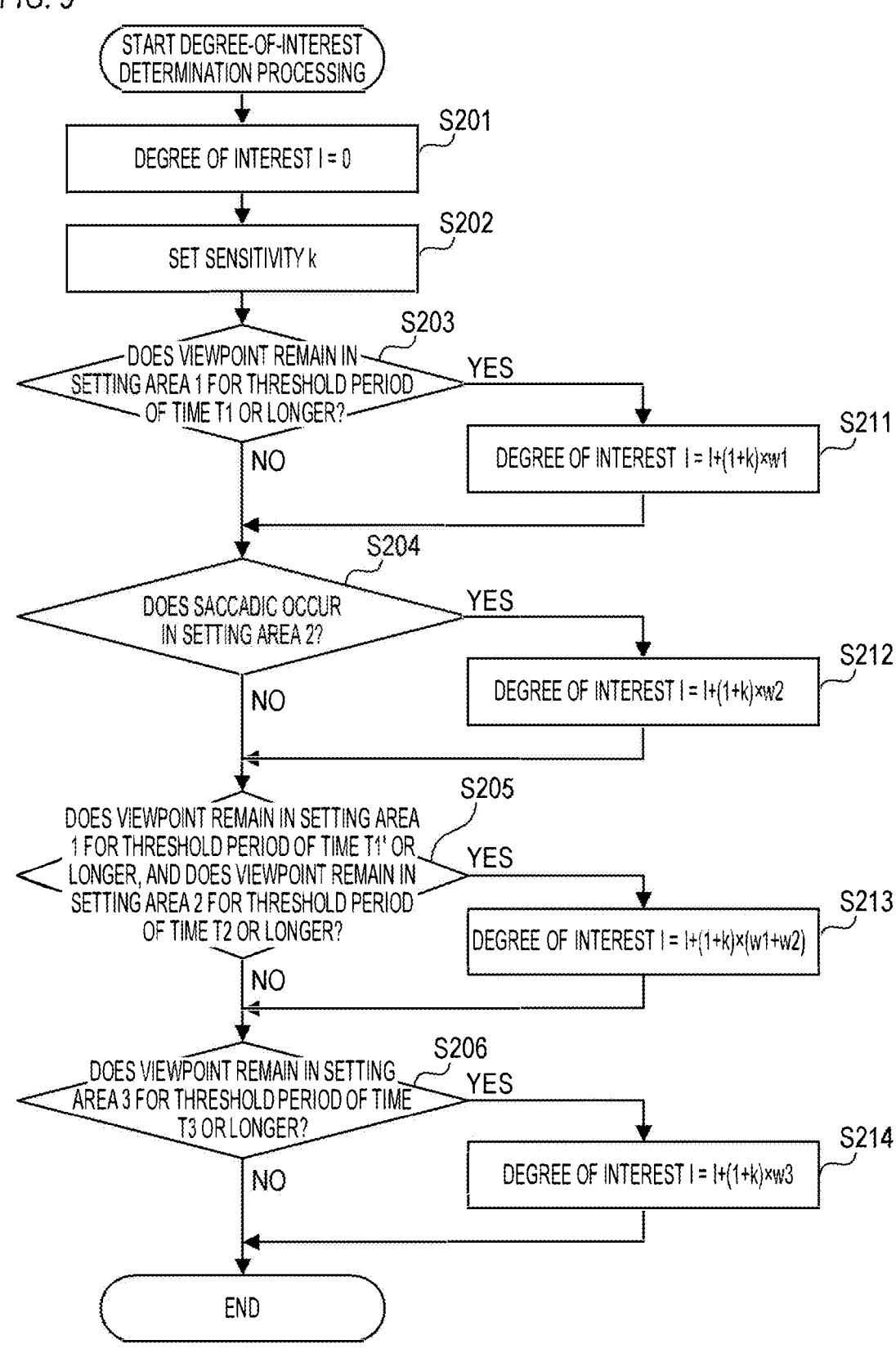
FIG. 9 is a flowchart of degree-of-interest determination processing.

The degree-of-interest determination processing (processing in step S105 in FIG. 6) is described with reference to FIGS. 8A, 8B, and 9. FIG. 8A illustrates the object of interest, and FIG. 8B illustrates degree-of-interest reference information corresponding to the object of interest in FIG. 8A. FIG. 9 is a flowchart of the degree-of-interest determination processing.

The object of interest in FIG. 8A is an advertisement medium and includes an eye catch area, a text area, and an image area. In an eye catch area disposed in an upper center portion of an object of interest, a catch phrase with a low relevance to a product to be advertised is described. A description of a product to be advertised and a company name of the product are described in a text area disposed at a lower center portion of the object of interest. An image of a product to be advertised is drawn in an image area arranged in a lower right portion of the object of interest.

The degree-of-interest reference information in FIG. 8B indicates a reference for determining the degree of interest of the user with respect to the object of interest for each of the plurality of areas of the object of interest. The degree-of-interest reference information in FIG. 8B indicates setting areas 1 to 3 (the relative arrangement of each of the setting areas 1 to 3 with respect to the entire objects of interest). The setting area 1 corresponds to the image area, the setting area 2 corresponds to the eye catch area, and the setting area 3 corresponds to the text area. Further, the degree-of-interest reference information in FIG. 8B indicates the type (image area/eye catch area/text area), the weight, and a related area for each of the setting areas 1 to 3. In FIG. 8B, the setting area 2 is set as the related area of the setting area 1, and the related areas are not set in the setting areas 2 and 3.

When the degree-of-interest determination processing of FIG. 9 is started, in step S201, the degree-of-interest determination unit 306 substitutes 0 for a degree of interest I (initialization of the degree of interest I).

In step S202, the degree-of-interest determination unit 306 sets a sensitivity k of the degree of interest I. As the sensitivity k is larger, the degree of interest I tends to be larger. For example, the degree-of-interest determination unit 306 sets a value corresponding to the attribute of the user as the sensitivity k so that a large value can be easily obtained as the degree of interest I of the user who is likely to be interested (desired to be interested). When the object of interest is an advertisement medium, and the advertisement target is a cosmetic product, the degree-of-interest determination unit 306 may set the sensitivity k so that a large value can be easily obtained as the degree of interest of the user of the age (age group) and the gender targeted by the cosmetic product.

In step S203, the degree-of-interest determination unit 306 determines whether the viewpoint of the user remains in the setting area 1 for a threshold period of time T1 or longer. This determination can also be regarded as a determination as to whether the line of sight of the user is directed to the setting area 1 for a predetermined threshold period of time T1 or longer. For example, the object-of-interest information indicates an area of the object of interest (the area of the object of interest on the display units 112) in the outside world image. The degree-of-interest determination unit 306 determines the setting area 1 on the display unit 112 based on the object-of-interest information and the degree-of-interest reference information of the object of interest (relative disposition of the setting area 1 with respect to the entire object of interest). Then, the degree-of-interest determination unit 306 determines whether the viewpoint remains in the setting area 1 on the display unit 112 for the threshold period of time T1 or more based on the line-of-sight information. The degree-of-interest determination unit 306 proceeds the processing to step S211 when it is determined that the viewpoint of the user remains in the setting area 1 for the threshold period of time T1 or more and proceeds the processing to step S204 when it is determined that the viewpoint of the user does not remain in the setting area 1 for the threshold period of time T1 or more.

In step S211, the degree-of-interest determination unit 306 updates the degree of interest I using the degree-of-interest reference information (a weight w1 of the setting area 1) of the object of interest. The degree-of-interest determination unit 306 updates the degree of interest I to a larger value as the weight w1 is larger. For example, the degree-of-interest determination unit 306 updates the degree of interest I using the following Formula 4.

$$I = I + (1 + k) \times w1 \tag{Formula 4}$$

In step S204, the degree-of-interest determination unit 306 determines whether saccadic in which the viewpoint moves in the setting area 2 occurs. The degree-of-interest determination unit 306 proceeds the processing to step S212 when it is determined that the saccadic into the setting area 2 occurs and proceeds the processing to step S205 when it is determined that the saccadic into the setting area 2 does not occur.

In step S212, the degree-of-interest determination unit 306 updates the degree of interest I using the degree-of-interest reference information (a weight w2 of the setting area 2) of the object of interest. For example, the degree-of-interest determination unit 306 updates the degree of interest I using the following Formula 5.

$$I = I + (1 + k) \times w2 \tag{Formula 5}$$

In step S205, the degree-of-interest determination unit 306 determines whether the viewpoint of the user remains in the setting area 1 for the threshold period of time T1' or longer, and the viewpoint of the user remains in the setting area 2 for a threshold period of time T2 or longer. When it is determined that the viewpoint of the user remains in the setting area 1 for the threshold period of time T1' or longer, and the viewpoint of the user remains in the setting area 2 for the threshold period of time T2 or longer, the degree-of-interest determination unit 306 proceeds the processing to step S213 and otherwise proceeds the processing to step S206.

In step S212, the degree-of-interest determination unit 306 updates the degree of interest I using the degree-of-interest reference information (weights w1 and w2 of the setting areas 1 and 2) of the object of interest. For example, the degree-of-interest determination unit 306 updates the degree of interest I using the following Formula 6.

$$I = I + (1 + k) \times (w1 + w2) \tag{Formula 6}$$

As described above, in the eye catch area corresponding to the setting area 2, a catch phrase having a low relevance to a product to be advertised target is described. Therefore, even if the user looks at the setting area 2, the user is not necessarily interested in the object of interest. As in steps S204 and S205, the setting area 2 is combined with other portions of the object of interest, whereby it is possible to determine whether the user is interested in the object of interest. As described above, the setting area 2 is set as the related area of the setting area 1. Therefore, in step S205, the setting area 1 and the setting area 2 are combined.

In step S206, the degree-of-interest determination unit 306 determines whether the viewpoint of the user remains in the setting area 3 for a threshold period of time T3 or longer. The degree-of-interest determination unit 306 proceeds the processing to step S214 when it is determined that the viewpoint of the user remains in the setting area 3 for the threshold period of time T3 or longer and ends the degree-of-interest determination processing in FIG. 9 when it is determined that the viewpoint of the user does not remain in the setting area 3 for the threshold period of time T3 or longer.

In step S214, the degree-of-interest determination unit 306 updates the degree of interest I using the degree-of-interest reference information (a weight w3 of the setting area 3) of the object of interest. For example, the degree-of-interest determination unit 306 updates the degree of interest I using the following Formula 7.

$$I = I + (1 + k) \times w3 \qquad \text{(Formula 7)}$$

Note that the threshold periods of time T1, T1', T2, and T3 may be predetermined fixed periods of time or may be periods of time changed appropriately. For example, the threshold periods of time T1, T1', T2, and T3 may be periods of time appropriately changed by the user or may be periods of time appropriately changed by the controller 120. The controller may determine the visibility of the object of interest based on the outside world image and set longer periods of time as the threshold periods of time T1, T1', T2, and T3, as the visibility of the object of interest is lower. The threshold periods of time T1, T1', T2, and T3 may be the same as or different from each other.

Though the example in which the three setting areas 1 to 3 are set is described, the number of setting areas is not particularly limited. The degree-of-interest determination processing is not limited to the processing illustrated in FIG. 9. The degree-of-interest reference information only needs to indicate a reference for determining the degree of interest of the user for the object and is not limited to the information illustrated in FIG. 8B. For example, the degree-of-interest reference information may indicate the order of viewing the setting area or may indicate the period of time for which the setting area is desired to be viewed.

CONCLUSION

As described above, according to the first embodiment, the predetermined degree-of-interest reference information corresponding to the object of interest is acquired from the storage unit and used, whereby the degree of interest of the user with respect to the object of interest can be determined with high accuracy. As a result, it is possible to perform a service of presenting, to the user, information of a product in which the user is interested with high accuracy, or it is possible to acquire the number of people who are interested in an object with high accuracy.

Second Embodiment

Figure 10:
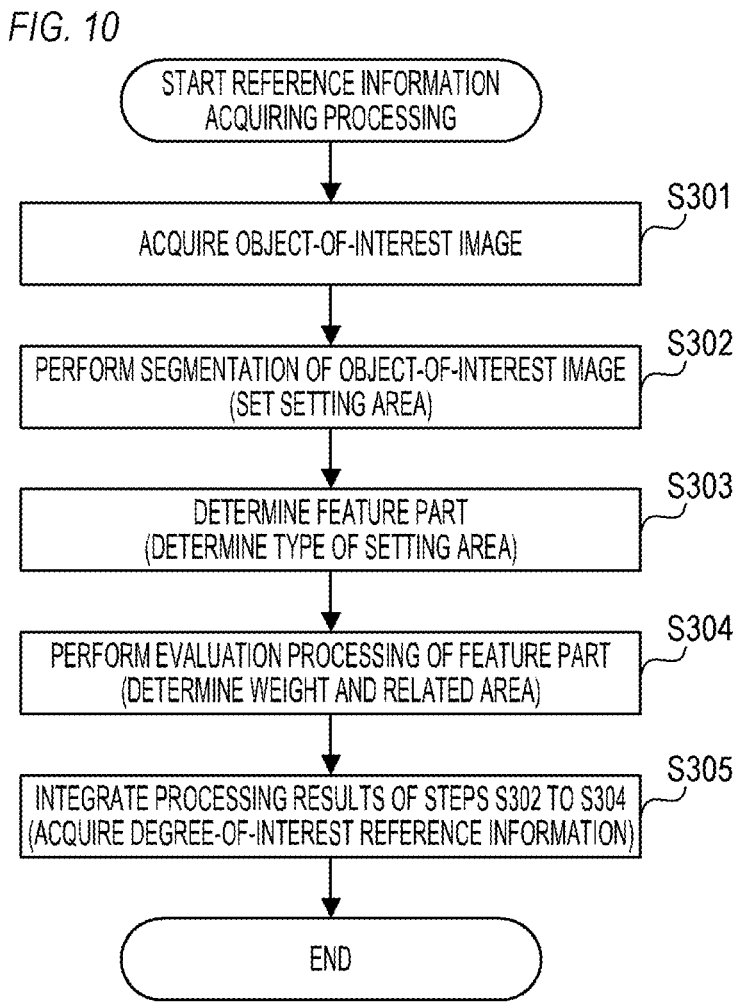
FIG. 10 is a flowchart of reference information acquisition processing according to a second embodiment.

A second embodiment of the present disclosure is described. Note that, hereinafter, the description of the same points as those of the first embodiment (for example, the same configuration and processing as those of the first embodiment) is omitted, and points different from those of the first embodiment are described. The overall processing of the second embodiment is the same as the overall processing of the first embodiment (FIG. 6). However, the reference information acquisition processing in step S104 is different between the first embodiment and the second embodiment. In the reference information acquisition processing of the first embodiment, the degree-of-interest reference information corresponding to the object of interest is selected from a plurality of pieces of degree-of-interest reference information prepared in advance. In the reference information acquisition processing of the second embodiment, the degree-of-interest reference information corresponding to the object of interest is acquired by analyzing the image of the object of interest. FIG. 10 is a flowchart of reference information acquisition processing according to the second embodiment. The degree-of-interest determination processing of the second embodiment is the same as the degree-of-interest determination processing of the first embodiment (FIG. 9).

When the reference information acquisition processing of FIG. 10 is started, in step S301, the reference information acquisition unit 305 extracts the area of the object of interest detected in step S103 from the outside world image acquired in step S101 of FIG. 6. As a result, the object-of-interest image (the image of the object of interest) is acquired.

In steps S302 to S305, the reference information acquisition unit 305 acquires the degree-of-interest reference information corresponding to the object of interest by analyzing the object-of-interest image acquired in step S301.

In step S302, the reference information acquisition unit 305 performs semantic area division (segmentation) of the object-of-interest image acquired in step S301. The setting areas 1 to 3 in FIG. 8B are set by the processing in step S302.

In step S303, the reference information acquisition unit 305 determines the type of the setting area (image area/eye catch area/text area) by detecting a feature part (for example, a character or an object) from the setting area for each setting area set in step S302.

In step S304, the reference information acquisition unit 305 determines the weight of the setting area and the related area by evaluating the feature part detected in step S303 for each setting area set in step S302. When the object of interest is an advertisement medium, a large weight may be determined in a setting area estimated to conform to the purpose of the advertisement, and a small weight may be determined in a setting area estimated not to conform to the purpose of the advertisement. For example, a large weight may be determined in the image area in which a product to be advertised is drawn, and a small weight may be determined in an eye catch area in which only the catch phrase having a low relevance to the product is described. Then, a medium weight may be determined in the text area in which the description of the product is described.

In step S305, the reference information acquisition unit 305 acquires the degree-of-interest reference information corresponding to the object of interest by integrating the processing results of steps S302 to S304.

Note that the reference information acquisition unit 305 may use an arithmetic unit (learned model) that receives an input of the object-of-interest image and outputs an analysis result of the object-of-interest image (for example, any processing result of steps S302 to S305). The arithmetic unit may be used for one piece of processing of steps S302 to S305, or the arithmetic unit may be used for two or more pieces of processing. The CPU 121 may function as the arithmetic unit, and the controller 120 may include a graphics processing unit (GPU) that functions as the arithmetic unit.

The server 130 may analyze the object-of-interest image and acquire the degree-of-interest reference information corresponding to the object of interest. In this case, for example, the reference information acquisition unit 305 transmits the outside world image or the object-of-interest image to the server 130, and the server 130 returns the degree-of-interest reference information corresponding to the object of interest to the reference information acquisition unit 305.

As described above, according to the second embodiment, the degree-of-interest reference information corresponding to the object of interest is acquired by analyzing the object-of-interest image, and the degree of interest of the user for the object of interest can be determined with high accuracy by using the acquired degree-of-interest reference information.

Note that the above-described various types of control may be processing that is carried out by one piece of hardware (e.g., processor or circuit), or otherwise. Processing may be shared among a plurality of pieces of hardware (e.g., a plurality of processors, a plurality of circuits, or a combination of one or more processors and one or more circuits), thereby carrying out the control of the entire device.

Also, the above processor is a processor in the broad sense, and includes general-purpose processors and dedicated processors. Examples of general-purpose processors include a central processing unit (CPU), a micro processing unit (MPU), a digital signal processor (DSP), and so forth. Examples of dedicated processors include a graphics processing unit (GPU), an application-specific integrated circuit (ASIC), a programmable logic device (PLD), and so forth. Examples of PLDs include a field-programmable gate array (FPGA), a complex programmable logic device (CPLD), and so forth.

The embodiment described above (including variation examples) is merely an example. Any configurations obtained by suitably modifying or changing some configurations of the embodiment within the scope of the subject matter of the present disclosure are also included in the present disclosure. The present disclosure also includes other configurations obtained by suitably combining various features of the embodiment.

According to the present disclosure, a degree of interest of a person in an object can be determined with high accuracy.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

The invention claimed is:

1. An information processing device comprising one or more processors and/or circuitry configured to:

execute first acquisition processing of acquiring line-of-sight information of a user;

execute detection processing of detecting an object viewed by the user based on the line-of-sight information;

execute second acquisition processing of acquiring, from a storage, reference information for determining a degree of interest of the user with respect to the object, the reference information being predetermined information corresponding to the object; and execute determination processing of determining the degree of interest based on the line-of-sight information and the reference information, wherein the reference information indicates a reference for determining the degree of interest for each of a plurality of areas of the object, and the degree of interest of whole of the object is determined based on line-of-sight information for each of the plurality of areas and the reference information.

2. The information processing device according to claim 1, wherein in the first acquisition processing, line-of-sight information for a right eye of the user and line-of-sight information for a left eye of the user are acquired, and in the detection processing, a three-dimensional position of the object is detected based on the line-of-sight information for the right eye of the user and line-of-sight information for the left eye of the user.

3. The information processing device according to claim 1, wherein the one or more processors and/or circuitry further executes a recording processing of recording the degree of interest in a server.

4. A head mounted display device comprising:

the information processing device according to claim 1; and a display.

5. The information processing device according to claim 1, wherein the reference information includes information on an order in which the plurality of areas are viewed.

6. The information processing device according to claim 1, wherein the reference information includes information on a length of time for viewing each of the plurality of areas.

7. The information processing device according to claim 1, wherein even in a case where the plurality of areas are viewed for a same length of time, an effect on determination of the degree of interest of the whole of the object is changed depending on types of the plurality of areas.

8. The information processing device according to claim 7, wherein the object is an advertisement medium, and even in a case where the plurality of areas are viewed for a same length of time, the effect on the degree of interest is greater in a case where the user views, among the plurality of areas, an area conforming to an advertisement purpose of the advertisement medium than in a case where the user does not view the area conforming to the advertisement purpose of the advertisement medium.

9. The information processing device according to claim 1, wherein even in a case where any one of the plurality of areas is viewed for a same length of time, an effect on determination of the degree of interest is greater in a case where the user views an image area of an advertisement target than in a case where the user views a text area.

10. A control method of an information processing device, comprising:

acquiring line-of-sight information of a user;

detecting an object viewed by the user based on the line-of-sight information;

acquiring, from a storage, reference information for determining a degree of interest of the user with respect to the object, the reference information being predetermined information corresponding to the object; and determining the degree of interest based on the line-of-sight information and the reference information, wherein the reference information indicates a reference for determining the degree of interest for each of a plurality of areas of the object, and the degree of interest of whole of the object is determined based on line-of-sight information for each of the plurality of areas and the reference information.

11. A non-transitory computer readable medium that stores a program, wherein the program causes a computer to execute a control method of an information processing device, the control method comprising:

acquiring line-of-sight information of a user;

detecting an object viewed by the user based on the line-of-sight information;

acquiring, from a storage, reference information for determining a degree of interest of the user with respect to the object, the reference information being predetermined information corresponding to the object; and determining the degree of interest based on the line-of-sight information and the reference information, wherein the reference information indicates a reference for determining the degree of interest for each of a plurality of areas of the object, and the degree of interest of whole of the object is determined based on line-of-sight information for each of the plurality of areas and the reference information.

*  *  *  *  *